United States Patent [19]

Turner et al.

[11] Patent Number: 4,642,185
[45] Date of Patent: Feb. 10, 1987

[54] DEVICE FOR RECOVERING OIL FLOATING ON WATER

[75] Inventors: John T. Turner, Stockport; Marios Christodoulou, Manchester, both of England

[73] Assignee: The Victoria University of Manchester, Manchester, England

[21] Appl. No.: 714,217

[22] Filed: Mar. 21, 1985

[30] Foreign Application Priority Data

Mar. 29, 1984 [GB] United Kingdom ............... 8408164

[51] Int. Cl.[4] ............................................. B01D 33/22
[52] U.S. Cl. ................................. 210/242.3; 210/396; 210/923
[58] Field of Search .................. 210/241, 242.1, 242.3, 210/242.4, 922, 923, 924, 776, 799, 780, 747, 170, 323.1, 324, 325, 327, 330, 396, 498, 541, 542; 114/232, 234

[56] References Cited

U.S. PATENT DOCUMENTS

| | | | |
|---|---|---|---|
| 3,865,730 | 2/1975 | Ayers et al. | 210/242.3 |
| 4,021,344 | 5/1977 | Webb | 210/242.3 |
| 4,220,533 | 9/1980 | Baer et al. | 210/242.3 |
| 4,368,122 | 1/1983 | Ravagnan | 210/242.3 |

FOREIGN PATENT DOCUMENTS

| | | |
|---|---|---|
| 1419114 | 12/1975 | United Kingdom . |
| 1523590 | 9/1978 | United Kingdom . |
| 2007516 | 5/1979 | United Kingdom ............ 210/242.3 |
| 1554458 | 10/1979 | United Kingdom . |
| 2050856 | 1/1981 | United Kingdom . |

OTHER PUBLICATIONS

Random House College Dictionary Random House Inc., 201 E. 50th Street, New York N.Y. 10022, 1980, p. 1498.

Primary Examiner—Richard V. Fisher
Assistant Examiner—Wanda L. Millard
Attorney, Agent, or Firm—Nies, Webner, Kurz & Bergert

[57] ABSTRACT

A device for recovering oil floating on the surface of water comprising a framework (50) and a number of discs (51) rotatably mounted thereon. The framework is supported on floats (58,59) with the discs partly immersed in the water, and each disc is associated with a scraper (57) and chute (54) so that oil removed from the disc is deposited into a collection tray (52) from which it can be removed via line (53). Each disc (51) carries at least one axially directed concentric ring (4,5) which presents an inwardly directed surface (7,8). Each disc may carry a plurality of rings of the same or different axial depths.

13 Claims, 15 Drawing Figures

DEVICE FOR RECOVERING OIL FLOATING ON WATER

This invention relates to devices for recovering oil floating on water.

Many systems have been proposed for recovering oil floating on the surface of water, many of which involve the use of rotating discs. For example, British Pat. Nos. 1419114, 1523590, 1554458 and British Application No. 2050856A all describe oil recovery devices, commonly known as disc skimmers, having a plurality of rotatable discs. The devices are supported on floats so that when they are placed in contaminated water, they float with the discs partially immersed in the water, there being a scraper associated with each disc so that on rotation of the disc the scraper removes the oil adhering to the disc surfaces. The discs used in the known systems have a smooth surface and are flat.

It has now been found that greater oil recovery rates can be achieved using, instead of a conventional flat disc, a disc having at least one arcuate projection on at least one face of the disc which projection provides an additional surface for the collection of oil. The projection may form a concentric ring on the surface of the disc.

Thus according to the present invention, there is provided a device for recovering oil floating on the surface of water comprising a framework, at least one disc rotatably mounted on the framework, means for rotating the disc, the framework being supported on floats so that when the device is placed on water it floats with the or each disc partially immersed in the water, the or each disc being associated with a scraper for removing liquid adhering to the disc during rotation thereof, the device being characterised in that said disc comprises a circular plate having at least one generally concentric axially projecting arcuate member on at least one face of the plate.

Embodiments of the invention, by way of example only, are described with reference to the accompanying drawings in which.

Figure 13:
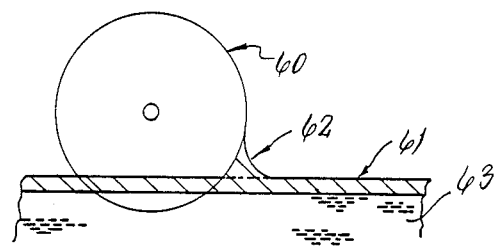
Figure 15:
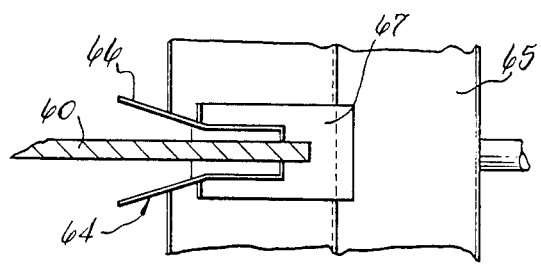
Figure 14:
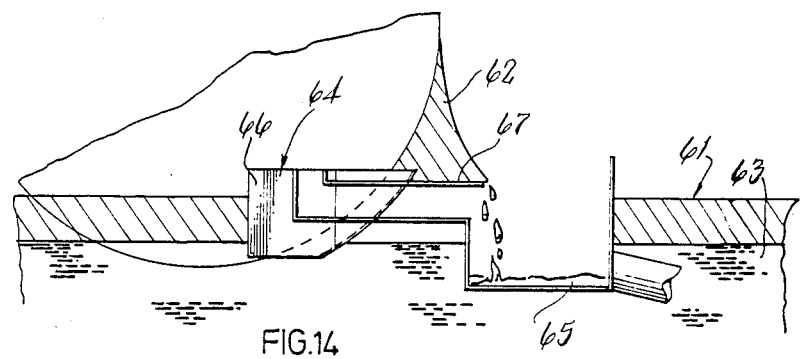

FIGS. 13 and 14 (elevations) and FIG. 15 (plan) illustrate diagramatically the geometrical and operational features of a device to collect oil from the peripheral edge of the rotating disc.

Figure 1:
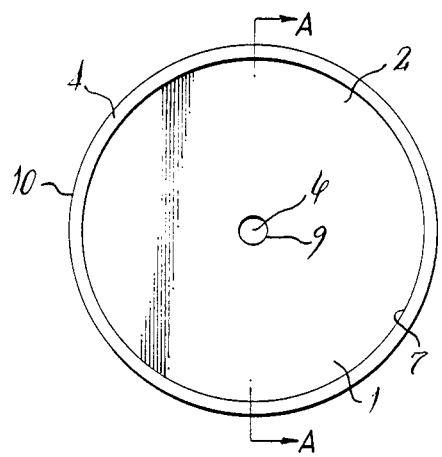
FIG. 1 is a side elevation of a disc for use in a device according to the present invention.
Figure 2:
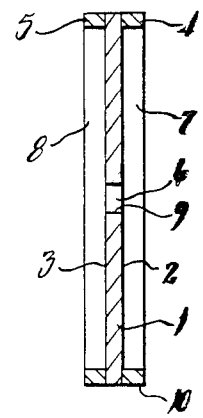
FIG. 2 is a cross-sectional view taken along the line A—A of FIG. 1.

FIGS. 1 and 2 show one embodiment of a disc for use in accordance with the invention which comprises a flat plate 1 having circular faces 2 and 3. Adjacent the circumference of faces 2 and 3 are rings 4 and 5 respectively. The rings are concentric and each ring presents a surface 7, 8 which is directed inwardly towards the center of the disc 6.

FIG. 2 shows the disc to be I-sectioned. A central hole 9 enables the disc to be mounted on a rotatable shaft. As shown in FIG. 2 the disc may be produced by bonding or otherwise attaching the rings 4 and 5 to the surface of plate 1 such as by adhesive or by welding, or brazing.

Figure 3:
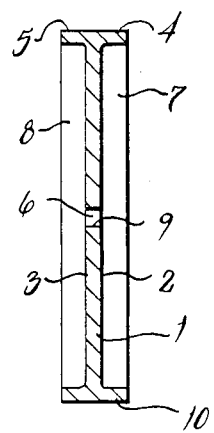
FIGS. 3 to 5 are similar cross-sectional views of discs having shapes similar to that of the disc illustrated in FIGS. 1 and 2, showing alternative methods of construction.
Figure 4:
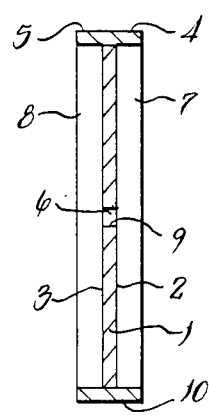
Figure 5:
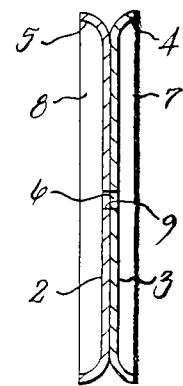

FIGS. 3 to 5 show alternative methods of producing a disc of the type shown in FIGS. 1 and 2. FIG. 3 shows a disc machined out of a single plate or cast so that the rings 4 and 5 and the plate 1 are all integrally formed. In FIG. 4 the rings 4 and 5 are in the form of a single ring fixed to the peripheral edge of plate 1. FIG. 5 shows a disc formed from two dished plates attached to each other back-to-back to form an I-sectioned disc. These methods of construction are by way of example only and should not be taken as limiting the invention. The examples indicate that the term "rings" as used throughout this specification and the annexed claims, should be taken as meaning the projections on the faces, however formed.

Scrapers generally of known design may be used with discs of the types shown in FIGS. 1 to 5 provided that they are adapted to scrape surfaces 2, 3, 7 and 8. The recovery of oil may be further increased by also scraping the peripheral edge 10 of the disc.

Figure 6:
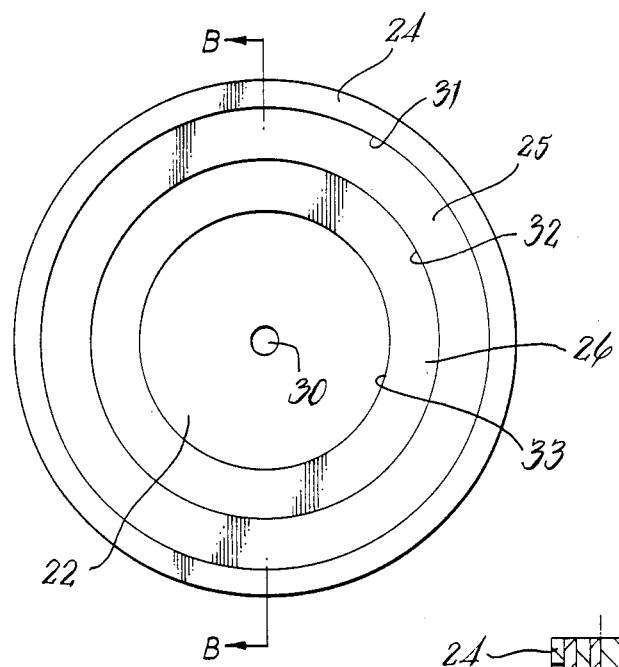
FIG. 6 is a side elevation of a second embodiment of a disc for use in a device according to the present invention.
Figure 7:
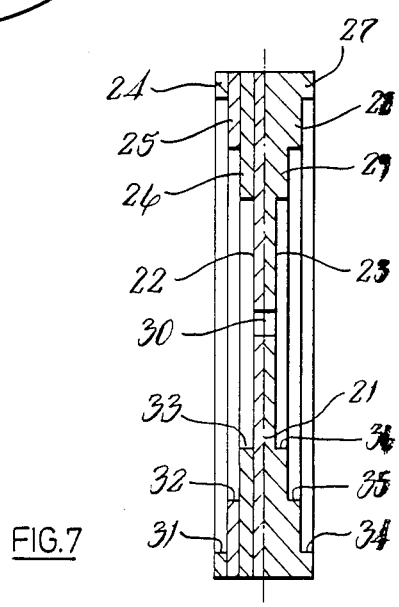
FIG. 7 is a cross-sectional view taken along line B—B of FIG. 6.

FIGS. 6 and 7 illustrate an alternative embodiment of a disc for use in accordance with the invention, which comprises a flat plate 21 having faces 22 and 23. On the faces 22 and 23 are three concentric rings 24, 25 and 26, and 27, 28 and 29, respectively. The rings have surfaces 31, 32 and 33, and 34, 35 and 36, respectively which are directed inwardly towards the center 30 of the disc. The rings are of different diameters and are superimposed axially so that the surfaces are staggered and the thickness of the disc decreases stepwise towards the centre.

As with the discs shown in FIGS. 1 to 5, there are a number of possible methods of producing discs of this design. For example the rings may be separately formed and then attached to the flat plate 21 as shown on the left hand side of the center line in FIG. 7, or the disc and rings may be formed integrally as indicated on the right hand side.

Figure 8:
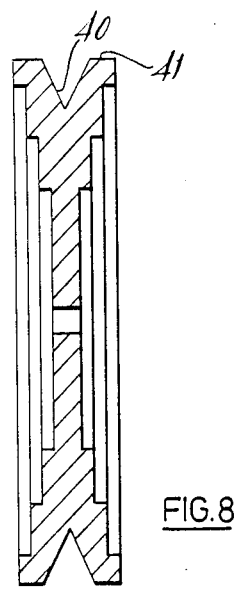
FIGS. 8 to 11 are cross-sectional views of further embodiments of the discs for use in a device according to the present invention.
Figure 9:
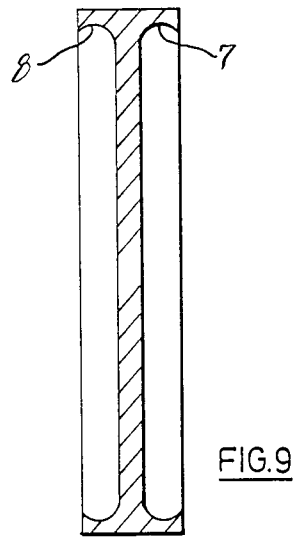
Figure 10:
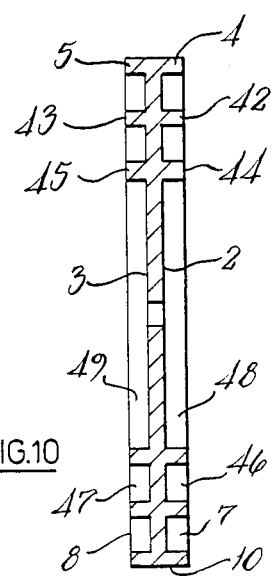
Figure 11:
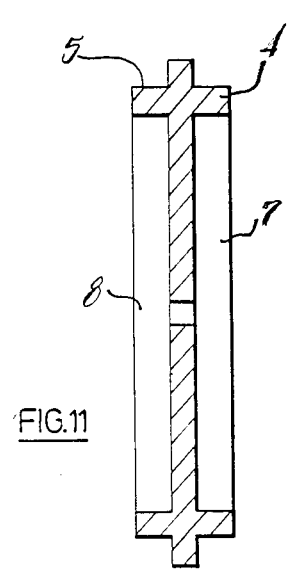

FIGS. 8 to 11 show further embodiments of discs for use in accordance with the invention. FIG. 8 is similar to FIG. 7 except that a V-shaped notch 40 is formed in the peripheral edge 41 of the disc. The notch provides further surfaces to which oil may adhere, and the oil may be removed from the notch using a suitably shaped scraper. FIG. 9 is similar to FIG. 2 except that the surfaces 7 and 8 are concave rather than flat. FIG. 10 is similar to FIG. 2 except that additional concentric but spaced rings 42, 43, 44 and 45 of different diameters but of the same axial depth have been positioned on the faces 2 and 3 thereby providing additional surfaces 46, 47, 48 and 49. FIG. 11 is also similar to FIG. 2 except that the rings 4 and 5 are positioned inwardly from the circumference of the disc.

Figure 12:
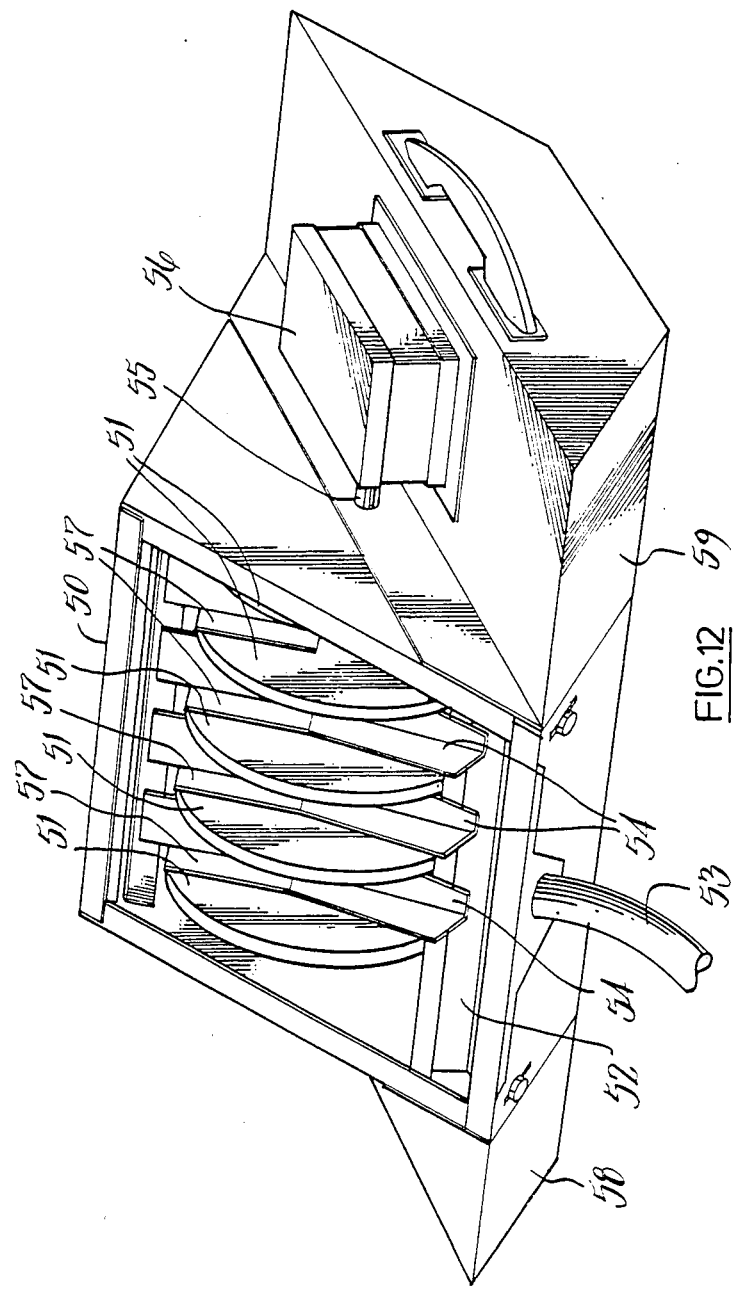
FIG. 12 is a perspective view of a device incorporating the present invention.

FIG. 12 is a schematic perspective view of a device incorporating the present invention. The device comprises five discs 51 of the type shown in FIGS. 1 and 2 for example, rotatably mounted on a framework 50. The means for rotating the discs comprises a motor 56 and a drive shaft 55. Scrapers 57 are provided to remove oil from the surfaces on the discs. The oil is carried by guide channels 54 which are associated with the scrapers, into a collection tray 52 from which it is removed via a hose 53. The framework 50 is supported on floats 58 and 59.

It has been found that further significant improvements in oil recovery rates can be obtained using a disc in conjunction with a "rim scoop" device, positioned close to its edge. This device has no physical contact with the disc but makes use of the flow field set up by the rotating disc to direct the oil, thrown from the periphery of the disc, into the collection tray. The principle of operation of the device is illustrated in FIGS. 13 to 15.

As a partially immersed disc 60 rotates through the oil film 61 over the water 63, it generates a spray of oil which rises above the free surface thus forming a "tail" 62 at the edge of the disc (see FIG. 13). The tail is formed when the oil carried on the outer rim and sides of the disc is ejected tangentially off the disc above the free surface. Subsequently, gravity causes this oil to fall back to the surface.

The volumetric flow rate of oil represented by the tail makes its recovery worthwhile. This recovery is achieved using a device referred to as a rim scoop. This is a partiaally submerged device 64 which is positioned close to the emerging edge of the disc where the tail of oil is formed. A shelf 67 surrounds the scoop 64 and extends towards and over a collection tray 65. The scoop has a tapered wall section 66 and its streamlined shape acts as a guide to the ejected oil, causing it to flow into collection tray 65 and yet its presence appears not to deflect any oil away from the disc which would otherwise form part of the tail. The rate of collection from the edge increases with the thickness of the disc itself and is also related to the speed of rotation of the system.

The whole device can be made from any material which is relatively inert to oil, water and sea water. Thus most metals or plastics may be used such as steel, stainless steel, aluminium, or polyacrylate.

The dimensions of the parts, particularly the discs, will be selected according to the intended use. For example, the discs may be about 1 meter in diameter, and in one floating unit there may be ten or more discs driven simultaneously on a common shaft.

The invention will be further illustrated by reference to the following experimental results.

EXAMPLE 1

A disc was constructed in accordance with the invention, from polymethyl-methacrylate. The disc comprised a plate having a projecting concentric ring at the circumference of each face. The diameter of the disc was 304 mm and the plate was 9 mm thick. Each concentric ring had a radial thickness of 1.5 mm and projected 3 mm from the face. The disc was machined from a single plate and so a cross section perpendicular to the faces and through the axis of the disc would have been similar to that illustrated in FIG. 3.

The disc was rotatably mounted in a tank containing oil so that the disc was partly immersed. The oil had a viscosity of 32 cSt at ambient temperature. Scrapers were provided to remove the adhering oil from the faces and the peripheral edge of the disc. The disc was then rotated at 75 rpm and the oil recovery rate of the disc measured for various depths of immersion of the disc in the oil. The results are given in Table 1 which also contains the oil recovery rates, under the same conditions, for a flat disc 304 mm in diameter and 3 mm thick of the same material.

TABLE 1

| Depth of immersion (mm) | Oil Recovery Rates ($cm^3/s$) | |
|---|---|---|
| | Disc having projecting rings | Flat disc |
| 30 | 80 | 28 |
| 50 | 90 | 49 |
| 65 | 105 | 67 |
| 100 | 130 | 103 |

The results show that the disc having the projecting rings had a greater oil recovery rate than the flat disc at each depth of immersion.

The recovery rates for each disc were then measured at various speeds with a depth of immersion of about 65 mm. The results given in Table 2 show that the disc having the projecting rings had a greater oil recovery rate than that of the flat disc at each speed.

TABLE 2

| Rotational speed of the disc (rpm) | Oil Recovery Rates ($cm^3/s$) | |
|---|---|---|
| | Disc having projecting rings | Flat disc |
| 30 | 30 | 21 |
| 45 | 56 | 36 |
| 60 | 81 | 51 |
| 75 | 116 | 67 |

EXAMPLE 2

A disc was constructed in accordance with the invention from polymethyl-methacrylate. The disc comprised a plate having three concentric projecting rings on each face. A cross section perpendicular to the faces and through the axis of the disc would therefore have been similar to that illustrated in FIG. 10. The diameter of the disc was 304 mm and the plate was 8 mm thick. The internal diameters of the three concentric rings on each face were 182 mm, 236 mm and 290 mm and each ring had a radial thickness of 7 mm and projected 12 mm from the face. The surface of each ring directed towards the center of the disc was substantially perpendicular to the face of the disc.

The disc was rotatably mounted in a tank containing a 23 mm thick layer of oil on water so that the disc was partly immersed in the oil and water. The oil had a viscosity, at ambient temperature, of 32 cSt. Scrapers were arranged so that the adhering oil could be removed from the faces and the peripheral edge of the disc. The disc was then rotated at 70 rpm and the oil recovery rate measured for various depths of immersion of the disc in the oil and water. The results are given in Table 3 which also contains the oil recovery rates under the same conditions of a flat disc 304 mm in diameter and 3 mm thick of the same material.

TABLE 3

| Depth of immersion (mm) | Oil Recovery Rates ($cm^3/s$) | |
|---|---|---|
| | Disc having projecting rings | Flat disc |
| 30 | 67 | 25 |
| 50 | 83 | 45 |
| 65 | 96 | 62 |
| 100 | 120 | 95 |
| 135 | 140 | 110 |

The results show that the disc having the projecting rings had a greater oil pick-up rate than the flat disc at each depth of immersion.

More oil was added to the tank until the oil thickness was greater than the radius of the disc. The oil recovery rates for the disc having the projecting rings and the flat disc were then measured for various rotational speeds. The results given in Table 4 show that the disc having the projecting rings had an oil recovery rate which was greater than that of the flat disc at each speed.

TABLE 4

| Rotation speed of the disc (rpm) | Oil Recovery Rate (cm³/s) | |
|---|---|---|
| | Disc having projecting rings | Flat disc |
| 30 | 35 | 30 |
| 60 | 110 | 90 |
| 90 | 210 | 175 |
| 110 | 285 | 235 |

EXAMPLE 3

A plain circular disc without any projections or concentric rings was constructed in mild steel plate with a diameter of 304 mm and a thickness of 1 mm.

The disc was rotatably mounted in a tank containing an oil film floating on water. The thickness of the oil film and the depth of immersion of the disc could be varied as required. The viscosity of the oil was 120 cSt at ambient temperature.

Scrapers were arranged to remove oil from the faces of the disc and a rim scoop was positioned close to the edge of the disc. Experiments were then performed in which the speed of the disc was varied for two different fixed depths of immersion. The results so obtained are summarised in Tables 5 and 6; the data for the plain disc without a rim scoop are shown alongside for comparison.

It can be observed that the effect of the rim scoop is to enhance significantly the oil recovery rate in comparison with the plain disc.

TABLE 5

| Depth of Immersion = 30 mm | | |
|---|---|---|
| Rotational speed of the disc (rpm) | Oil Recovery Rate (cm/s) | |
| | With Rim Scoop | Without Rim Scoop |
| 25.6 | 25.6 | 13.3 |
| 33.8 | 45.8 | 19.2 |
| 40.5 | 61.5 | 23.5 |
| 46.8 | 75.8 | 28.2 |
| 54.0 | 87.5 | 31.2 |
| 60.9 | 105.0 | 36.7 |
| 68.6 | 113.3 | 38.3 |
| 76.0 | 128.0 | 44.0 |
| 83.8 | 138.0 | 46.0 |
| 90.3 | 144.0 | 46.0 |
| 101.4 | 154.0 | 46.0 |
| 109.1 | 158.0 | 46.0 |

TABLE 6

| Depth of Immersion = 85 mm | | |
|---|---|---|
| Rotational speed of the disc (rpm) | Oil Recovery Rate (cm³/s) | |
| | With Rim Scoop | Without Rim Scoop |
| 27.4 | 58.0 | 44.0 |
| 34.2 | 92.3 | 60.0 |
| 40.3 | 128.3 | 75.0 |
| 47.0 | 177.5 | 93.0 |
| 54.0 | 228.0 | 110.0 |
| 60.9 | 271.3 | 127.0 |
| 67.0 | 330.0 | 150.0 |
| 74.3 | 360.0 | 160.0 |
| 81.6 | 392.5 | 178.0 |
| 89.2 | 420.0 | 190.0 |
| 96.0 | 450.0 | 200.0 |
| 103.1 | 480.0 | 213.0 |

TABLE 6-continued

| Depth of Immersion = 85 mm | | |
|---|---|---|
| Rotational speed of the disc (rpm) | Oil Recovery Rate (cm³/s) | |
| | With Rim Scoop | Without Rim Scoop |
| 112.0 | 503.3 | 227.0 |

It is not intended to limit the invention to the above examples only. For example, rings such as those shown in FIGS. 7 and 8 can be positioned so that the disc thickness reduces outwardly, with the maximum thickness at or spaced from the center of the disc, or reduces both inwardly and outwardly from one or more positions of maximum thickness. In addition the change in thickness can be gradual instead of stepwise, thus to present a sloping surface directed inwardly and/or outwardly.

Whilst the ring or rings have been described herein as continuous annular members, they can be one or more discontinuous arcuate members disposed generally concentrically on the disc face.

We claim:

1. A device for recovering oil floating on the surface of water comprising a framework, at least one disc rotatably mounted on the framework, means for rotating the discs, the framework being supported on floats so that when the device is placed on water it floats with the or each disc partially immersed in the water, the or each disc being associated with a scraper for removing liquid adhering to the disc during rotation thereof, the device being characterized in that said disc comprises a circular plate having at least one generally concentric axially projecting arcuate member on at least one face of the plate, and wherein said arcuate member presents at least one inwardly directed surface.

2. A device according to claim 1, wherein said at least one arcuate member is a continuous ring presenting a surface which is directed inwardly towards the center of the disc.

3. A device according to claim 1, wherein said axially projecting arcuate member is positioned at the circumference of the plate.

4. A device according to claim 2, wherein said inwardly directed surface is flat.

5. A device according to claim 2, wherein said inwardly directed surface is concave.

6. A device according to claim 1, including, on at least said one face of the plate, a plurality of concentric axially projecting rings of different diameters and superimposed axially.

7. A device according to claim 1, including a plurality of concentric axially projecting rings of different diameters spaced apart radially on said plate but having the same axial depth.

8. A device according to claim 1, wherein said axially projecting arcuate member is positioned inwardly from the circumference of said plate.

9. A device according to claim 1, including an annular notch in the outer peripheral surface of the disc.

10. A device according to claim 1, wherein the or each said axially projecting arcuate member is integrally formed with said plate.

11. A device according to claim 1, wherein the or each said axially projecting arcuate member is provided on each face of said plate.

12. A device according to claim 1, wherein said disc comprises a pair of dished plates attached back-to-back thus to present a concentric ring extending axially from each face of the disc.

13. A device according to claim 1, further characterised by a scoop member having a curved guide surface disposed adjacent the peripheral edge of said disc to direct oil projected from the periphery of the disc into a collection tray.

* * * * *